United States Patent Office 3,503,803
Patented Mar. 31, 1970

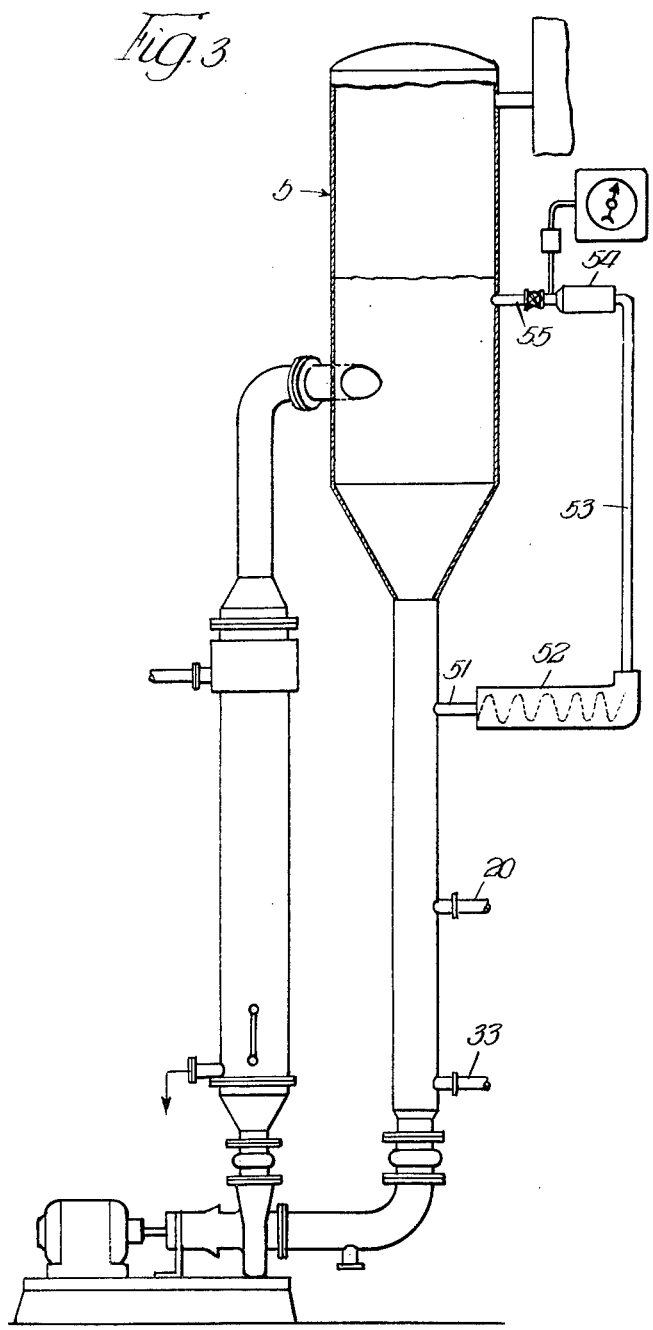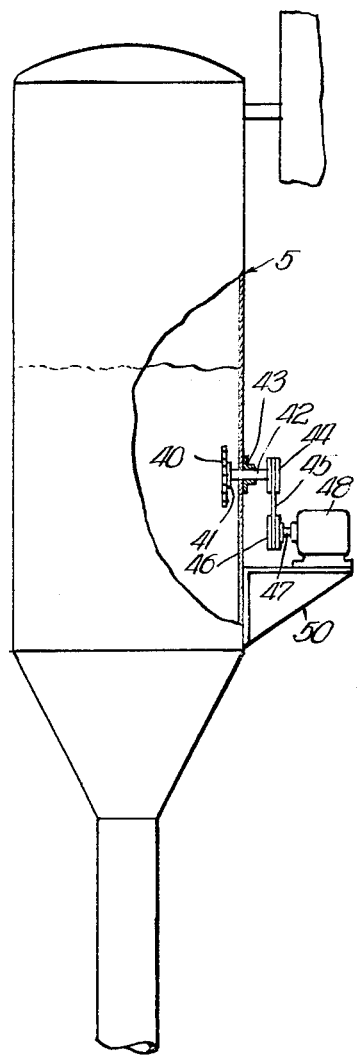

3,503,803
CONTINUOUS PRODUCTION OF CRYSTALLINE SUCROSE
Richard C. Bennett, Park Forest, Ill., and Harold B. Caldwell, Sarasota, Fla., assignors to Whiting Corporation, a corporation of Illinois
Continuation-in-part of application Ser. No. 335,597, Jan. 3, 1964. This application Mar. 22, 1968, Ser. No. 723,641
Int. Cl. C13f *1/02;* B01d *9/00;* C13k *1/10*
U.S. Cl. 127—16
21 Claims

ABSTRACT OF THE DISCLOSURE

A process and apparatus for continuous production of crystalline sucrose wherein nucleating means is employed to produce a sufficient number of nuclei in the system sired size range, for example, a sugar product which falls within the size range of commercial granulated sugar. In a preferred embodiment, the nucleation means include the circulation pump for the system and an additional energy input device such as, for example, a rotating saw blade, which imparts the desired rate of nucleation to the supersaturated sucrose slurry without necessiating an increase in the speed at which the circulation pump is operated.

Background and description of invention

Figure 1:
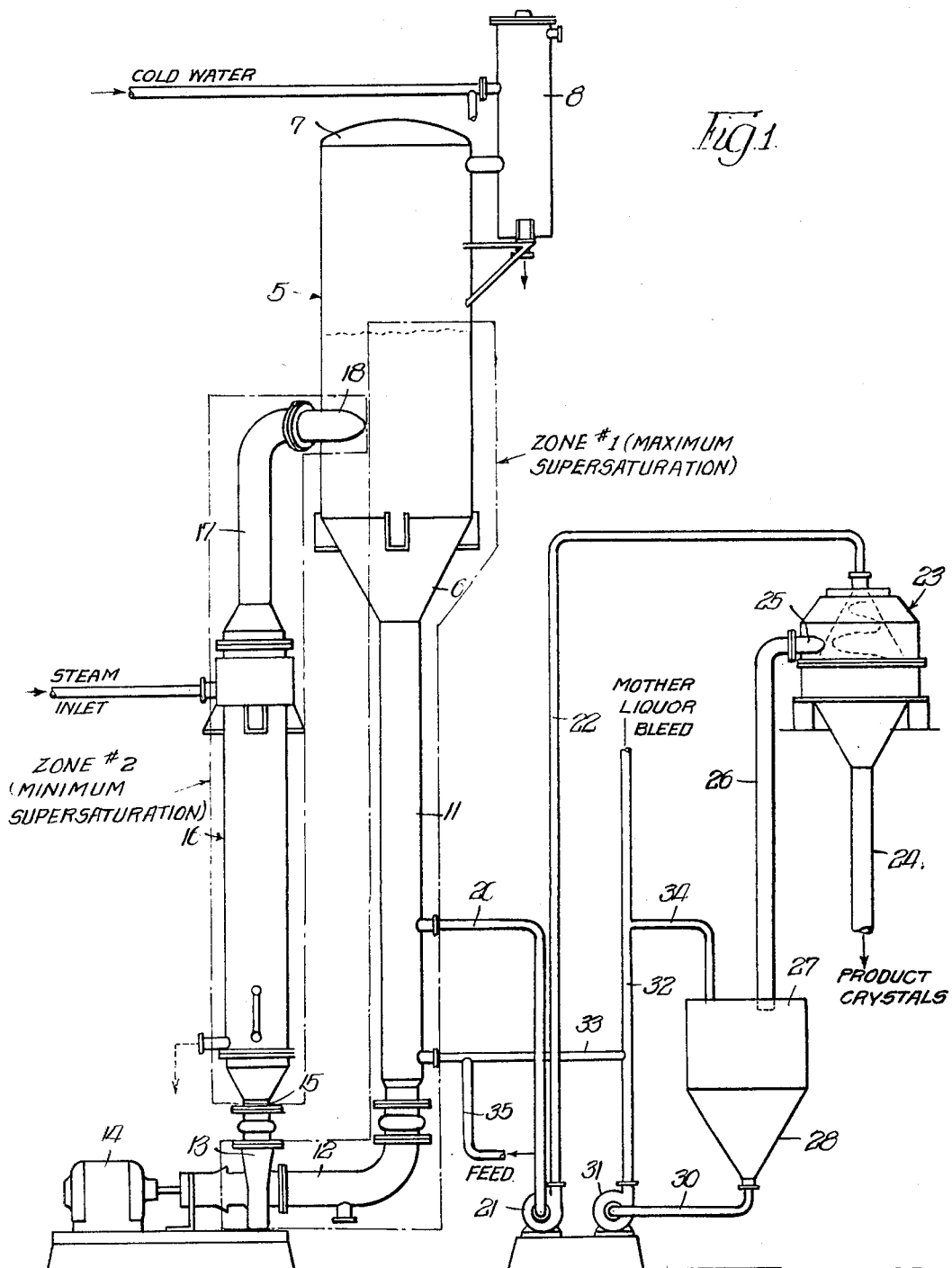

This application is a continuation-in-part of our copending application entitled, Continuous Production of Crystalline Sucrose, Ser. No. 335,597, filed on Jan. 3, 1964, now abandoned.

This invention relates, generally, to improved process and apparatus for the continuous production of crystalline sucrose which represent basic improvements on the conventional batch process and apparatus conventionally employed for the production of this product.

Sucrose (i.e., cane sugar or beet sugar) is a basic food commodity. A great many tons of this product are produced and utilized annually throught the civilized world. In view of the long standing importance of sucrose, it is surprising that practically all of it is made in accordance with a batch process with known batch equipment that have undergone no basic change for years. It is true that there have been a number of innovations and improvements in the conventional sucrose crystallizing process and apparatus but for the most part these have been in the nature of improved instrumentation and automated controls for the purpose of carrying out the known steps of the batch process with greater uniformity and automatically. However, the essential batch steps still have been retained.

In the conventional crystallizing process as carried out in cane and beet sugar refineries concentrated and purified sugar juice is fed to the so-called vacuum pans at between 70 and 75 percent sugar content and a purity of about 99.5 percent. A vacuum pan is a well-known piece of equipment and is basically a large enclosed vessel provided with indirect heat exchanger means in the lower portion and connected adjacent the top with a source of vacuum. Steam is the usual source of heat. These vacuum pans are highly developed and come in various sizes. In operation they are filled to the proper level with a batch of the concentrated and purified sugar juice, and heat and vacuum are applied so as to produce boiling of the sugar solution with resultant rapid evaporation of water. The solution is boiled until a super-saturated condition is achieved as indicated or measured by boiling point elevation. Thereupon, seed crystals (e.g. powdered sugar) are added, and depending upon the quantity of the seed crystals and their size, the batch may be either "shock seeded" or "fully seeded." Boiling of the pan contents is carried out in such a way as to minimize nucleation (i.e., formation of new crystals) and the production rate is increased as the seed surface available for deposition of new growth increases. As the evaporation proceeds and the fine grains of sugar continue to grow, fresh concentrated sugar juice is added to the pan contents in which the super-saturation ranges between 1.1 and 1.4, and the process of evaporation continues until the pan is filled to capacity with a semifluid mass or magma containing about 50 to 65 percent by weight of sucrose crystals or about 70–90 percent by true volume.

Specimens are withdrawn from a vacuum pan from time to time by the operator for checking the progress of the batch and the end of the batch is sensed largely by a lack of mobility of the magma. At the end of the batch a large valve at the bottom of the pan is opened and the entire mass is dumped or dropped into an agitated jacketed receiving vessel known as a mixer.

The manipulation of the evaporator pans or vacuum pans, particularly during the latter phases of a batch, is a highly skilled operation and the persons who carry out this function are practically in a class by themselves inasmuch as the quality of the product, and to a large extent the quantity of the sugar produced, are largely dependent upon their skill. The bringing of the contents of a vacuum pan to the point where they are dumped is referred to in the industry as a "strike." Sugar refineries vary considerably with respect to the length of time used for a strike but the typical fast strike would take about 70 minutes while a more average strike time would run 110 minutes.

The contents of the mixers are used to feed one or more centrifuges generally operating on a programmed batch cycle. Each centrifuge discharges product crystals and mother liquor in separate streams. One half of the sugar available in the purified juice going into the first vacuum pan is removed in the so-called "first strike." The purity of the mother liquor from the first strike going to the second strike pan is approximately 99 percent. In the second strike pan and its associated centrifuge approximately 50 percent of the total sugar in the first strike mother liquor is removed with the purity of the mother liquor from the second strike centrifuge decreasing to about 98 percent. The procedure is continued on through four or five strikes. The mother liquor from the centrifuge associated with the fourth strike pan is referred to as "fourth run-off liquor." Some refineries make a fifth strike and liquor from this strike is then referred to as "fifth run-off liquor." Of course, the purity of the mother liquor decreases as the strikes proceed. In addition there is a lowering of the quality sugar from the first strike through successive strikes. Thus, the sugar from the first strike is normally a higher grade than required while sugar from the seocnd strike is generally equal to that of the product which is shipped The quality of the sugar from additional strikes is lower. Hence, sugar from the first strike is customarily blended with sufficient sugar produced in the third and fourth strikes so that the resulting color equals that from the second strike. Generally speaking, some of the fourth strike sugar and all of the fifth strike sugar is too dark for use and must be reprocessed into remelt sugar.

The foregoing by no means covers all of the many aspects of the conventional batch process for crystallizing sugar from purified cane or beet sugar juices. However, it will suffice to bring out the complexity of the conventional batch process and the great amount of skill that is involved and the numerous opportunities for introduction of variations and errors in production.

Inasmuch as the advantages of any completely controlled continuous process over a complicated batch process are widely known and appreciated, it would be obvious to expect that prior efforts have been made to crystallize sucrose on a continuous production basis rather than adhere to the complicated batch process which has remained essentially unchanged for a great many years. The fact of the matter is that prior efforts to convert the batch crystallizing process into a continuous one have involved complicated apparatus and operating procedures and in the final analysis have not been sufficiently practical to meet with commercial acceptance.

In accordance with the present invention a continuous process and apparatus for crystallizing sucrose crystals is provided which have the virtue of being relatively simple in contrast with both the conventional batch process and apparatus as well as prior continuous process and apparatus that have been proposed.

The object of the present invention, generally stated, is the provision of a practical continuous process and apparatus for continuously producing crystalline sucrose starting with purified and concentrated cane or beet sugar juice and controlling the size of the product crystals by controlling the number of nuclei present in a circulating magma so that they are adequately uniform as well as fine enough to fall within the normal particle size range of ordinary granulated sugar of commerce.

A further object of the invention is the provision of such a continuous process and apparatus which is characterized by the following advantages and improvements: the fine sucrose crystals produced therein are predominantly single crystals, containing few if any conglomerates, they exhibit superior form and color, and have nice clean grain structure; the process can be carried out so as to be self-seeding with seed being continuously generated in sufficient numbers by nucleating stimuli and attrition; good quality sucrose crystals can be produced from relatively low purity mother liquor; the process operates at lower slurry density than the conventional batch process; crystal size can be conveniently controlled within the desired range of fineness, often by regulating the speed of a circulating pump, or by means of auxiliary devices such as high speed rotating blades or high frequency generators disposed so as to impart nucleating stimuli to the slurry in or near a place where super-saturation is at or near the maximum or by regulating the proportion of small crystals returned to the system with mother liquor, or by any suitable combination of these techniques; the wide variations in steam loads, cooling water loads, and power requirements inherent in the batch process are eliminated; much less steam is needed; less labor is required and the services of the highly skilled vacuum pan operators are no longer required; storage space is no longer required for accumulation of mother liquor; the apparatus may be smaller and more conveniently arranged in less space on a single floor level and even located out of doors if desired; and, the steps are reduced to just two in number, i.e., forced circulation crystallization and contrifugation.

Certain further objects of the invention will be apparent from the following detailed description of the invention and illustrative embodiments set forth therein.

For a more complete understanding of the nature and scope of the invention, reference may now be had to the following detailed description thereof taken in connection with the accompanying drawings, wherein:

FIG. 1 is a diagrammatic flow sheet of a continuously operating apparatus or system by means of which sucrose crystals may be continuously produced by the process of this invention;

FIG. 2 is a view of the crystallizer vessel of the apparatus in FIG. 1 partly broken away and showing a submerged rotating element on the vessel interior, driven from the exterior by a motor for the purpose of generating nucleating stimuli in a region of maximum super-saturation and, FIG. 3 is a partial diagrammatic view of the apparatus shown in FIG. 1 but provided with external hydraulic circuit means including an ultrasonic generator for delivering nucleating stimuli to the contents of the crystallizer vessel in a region of maximum super-saturation.

Contrary to the problem experienced in the majority of crystallizing operations wherein the natural tendency is for large numbers of fine crystals to form at the expense of fewer large crystals and measures have to be taken to suppress nucleation and destroy fine crystals on the one hand while promoting the growth of larger product crystals on the other, the problem associated with crystallizing sucrose from sugar solutions is just the opposite. That is, the crystals that form have a marked tendency to grow larger and nuclei formation is insufficient to supply the large number of the desired fine crystals. The problem is to prevent this natural phenomenon from occurring by promoting nucleation and formation of large numbers of fine product size crystals. Failure to recognize and satisfactorily solve this problem of controlling crystal size has remained as the major obstacle to a successful continuous process for commercially producing crystalline sucrose from cane or beet sugar solutions. As indicated above, the present invention provides one practical solution to the problem.

Referring to FIG. 1 an upright closed crystallizer vessel is indicated generally at 5 in which both evaporation and crystallization occur. The vessel 5 is cylindrical and provided with a conical bottom 6 and a curved top 7. The normal operating liquid level in vessel 5 is in the lower portion thereof leaving an enclosed free-board or liquid-disengaging space thereabove which is maintained under vacuum by means of a condenser 8 of known type.

A vertical column or leg 11 formed by pipe of suitable diameter connects at the top with the opening in the base of cone 6 and at the bottom joins an elbow section 12 the lateral arm of which connects with the suction or inlet opening of a circulating pump 13. The pump 13 is of known type and is driven by a suitable prime mover such as an electric motor of known type indicated at 14. The motor 14 is either of the variable speed type, or a variable drive of known type interconnects the motor and the pump, so that the pump 13 may be driven at any selected speed within its operating range. The discharge connection of the pump 13 connects with a short length of conduit 15 which leads into the bottom inlet connection of a heat exchanger indicated generally at 16. The heat exchanger 16 may be of known type such as one in which the heating medium (e.g. steam) fills a chamber or chest through which pass a plurality of vertical tubes through which the fluid material to be heated may flow upwardly through the heat exchanger 16 and discharge through the top outlet connection. The top outlet connection of the heat exchanger 16 is connected by means of an elbow conduit section 17 to an inlet connection 18 to the vessel 5.

It will be seen that the vessel 5 provided with its condenser 8 and the recirculatory system which includes the column 11, pump 13 and heat exchanger 16, constitutes a forced circulation crystallizer apparatus in which the liquor of fluid material can be heated to the desired temperature level and is recirculated through a closed loop at the desired rate while a vacuum of desired value is maintained within the vessel 5.

Intermediate the ends of the column or leg 11 a pipeline 20 comes off to the side and connects with the inlet connection of a slurry discharge pump 21. The discharge connection of the pump 21 has one end of the pipeline 22 connected therewith which leads to the upper inlet connection of a continuous type centrifuge 23 which is desirably of the type which includes a foraminous member or screen which operates to hold back or prevent passage of crystals of product size or larger but allows "fines" (i.e., small, undersized crystals) to pass through with a discharge stream of mother liquor or filtrate. Commercially available continuous centrifuges of this type which serve very satisfactorily for this apparatus and process are the so-called Mercone Centrifuge, manufactured by Dorr-Oliver, Inc., or the Conejector Centrifuge, manufactured by the Sharples Corp.

Damp product size sucrose crystals discharge from the bottom connection of the centrifuge 23 through the discharge line 24. They are dried and handled for final packaging in known manner.

The mother liquor and fine crystals discharge as filtrate from the centrifuge 23 through the side connection 25 to which is joined a line 26 which discharges into a tank 27 provided with a conical bottom 28 and having a line 30 connected thereto leading to the inlet connection of a circulating pump 31. The discharge connection of pump 31 is connected with a line 32 which at its upper end leads to mother liquor bleed or discharge for purpose of maintaining the impurities in the system at a predetermined maximum level. Intermediate the ends of line 32 a return line 33 leads off to a connection with the column or conduit 11 at a point below the place where the line 20 comes off. Return line 34 leads off from the line 32 to the tank 27 so as to permit recirculation in the tank 28 if desired when not returning mother liquor to the crystallizer because of a high level condition therein.

Concentrated and purified sugar juice may be introduced into the system through a feed line 35 connected with the line 33 as shown. It may also be introduced directly into the leg 11 below line 20, into the elbow 12, into section 17 on the discharge side of the heater 16, or any other point that is both downstream and removed from the discharge connection 20.

The closed loop in which the main recirculation occurs includes two zones in terms of maximum and minimum super-saturation. These zones have been indicated in FIG. 1 in broken lines as Zone 1 (maximum super-saturation) and Zone 2 (minimum super-saturation). It will be seen that Zone 2 includes the heat exchanger 16 and the conduit section 17 and inlet connection 18 while the balance of the circulating loop comprises Zone 1.

The following specific example will illustrate a preferred embodiment of the invention including the procedure for starting up and continuously operating the apparatus shown in FIG. 1.

EXAMPLE I

Purified cane sugar juice having a sugar content of 70% is introduced through the feed line 35 so as to fill the crystallizer vessel 5 to the liquor level indicated and at the same time completely fill the main recirculating system including the leg 11 and the heat exchanger 16. When filling has been accomplished the main circulating pump 13 is started, steam is introduced into the heat exchanger 16 and cooling water is introduced into the condenser 8. The pump 13 is driven at a speed so that the liquor load in the crystallizer vessel 5 is recirculated approximately every 30 seconds.

As the liquor becomes increasingly saturated due to evaporation in the freeboard space above the liquor level, the level is maintained by feeding additional sugar juice in through line 35. The liquor contents in the crystallizer 5 are sampled periodically and when a sample of the liquor indicates that it has reached super-saturation such as by refractometer reads, a pail of seed slurry (e.g., powdered sugar) is introduced through the feed line to hasten crystal formation. After filling the system it usually takes about a half hour for the liquor to reach super-saturation. Thereafter in approximately 30 minutes product size crystals will have formed in substantial numbers in the slurry and then the pump 21 is started and slurry is withdrawn through the line 20 into the centrifuge 23. The flow in line 20 is approximately 1% that of the flow in leg 11. Product size crystals having particle size in the range of 50–70 U.S. mesh and having particle size distribution corresponding to a coefficient of variation (C.V.) of 35–50% are separated within the centrifuge 23 from fines and mother liquor with the latter discharging through the side connection 25. The product size sucrose crystals discharge through the bottom connection in line 24 and are dried in known manner. They are characterized by being practically entirely single crystals with very few conglomerates. They have excellent form, and color and nice clean grain structure.

All of the mother liquor with the fines is returned to the main system through the line 33 by means of the circulating pump 31 except for that which is bled off in order to prevent the impurities (principally ash and color materials) from building up in the system to above a predetermined maximum level such as 10% of the total solids present. The combined streams of mother liquor returned through line 33 and sugar juice fed in line 35 are sufficient to equal the stream of sugar slurry withdrawn through line 20 and the evaporated water, whereby the system is balanced in operation.

The sucrose crystals discharged from the separator 23 are primarily individual crystals of high purity and color, essentially free of conglomerates.

The following table gives typical operating conditions of the system shown in FIG. 1 as well as the permissible ranges for these various values.

TABLE I

| | Typical | Range |
|---|---|---|
| Feed concentration | 70% | 60–80%. |
| Feed temperature | 70° C | 25–100° C. |
| Rate of recirculation or turnover by the pump 13. | Twice/min | ½ to 4 times/min. |
| Pump 13 speed | 500 r.p.m. | 250–1,150 r.p.m. |
| Liquor inlet temperature to heat exchanger 16. | 70° C | 50–90° C. |
| Liquor outlet temperature from heat exchanger 16. | 72° C | 50.5–95° C. |
| Absolute pressure in free board space (inches of Hg). | 6" | 2.3–20". |
| Rate of flow of sugar slurry in line 20. | 3% of body volume/min. | 0.5–5%. |
| Rate of sucrose crystals discharged. | 4 lb./hr./gal. of crystallizer volume. | 1–5 lb. |
| Rate of mother liquor bleed off | 5% of feed to crystallizer (in a single stage system). | 4–50%. |

Typically the equipment for the system shown in FIG. 1 may have the following design specifications:

CRYSTALLIZER VESSEL 5

The vessel (vapor head) 5 may be 10'–0" in diameter by 16'–0" on the straight side, fabricated of welded ⅜" thick steel in the lower section and ⅜" thick stainless steel clad steel in the upper section. This vessel is closed at the top with a 45° cone terminating in a 5'–0" diameter dished head and at the bottom with a 60° cone and a 26" diameter circulating pipe outlet. The vessel can have a 24" tangential liquor inlet and a 14" vapor outlet.

HEAT EXCHANGER 16

The vertical heating element may be approximately 32" in diameter fabricated of ¼" thick welded steel. The heating surface will consist of 120'–2" by 14-gauge average wall by 16'–0" long welded steel tubes rolled at each end into 1¼" thick steel tube sheets. The heating element will be complete with steam inlet, condensate level gauge, vent and gauge connections, condensate outlet and a pop warning valve.

The liquor chambers may be constructed of ¼" thick welded steel. The liquor chambers will be arranged for single pass circulation through the heating element and will be bolted to the heating element shell.

CIRCULATING PIPING 11, 12, 15, 17

The circulating piping may be fabricated of ¼" thick welded steel. The necessary 26" diameter circulating piping to connect the body with the circulating pump and the discharge of the circulating pump to the heater and the top of the heater back to the tangential inlet of the vapor head will be provided.

CIRCULATING PUMP 13

A Morris 20" mixed flow pump with 24" suction and 20" discharge connection may be provided complete with water cooled gland, in and out connections to the stuffing box, casing drain and V-belt drive. The pump should be of semisteel construction with stainless steel trim. The suction and discharge connections of the pump may be supplied with a single corrugation expansion joint formed of stainless steel with liners to protect the pump from piping strains.

VACUUM EQUIPMENT 8

A 2'-0" diameter countercurrent barometric condenser of steel construction may be used with a single stage steam jet air ejector of cast iron and bronze construction.

CENTRIFUGE 23

A Dorr Mercone continuous centrifuge Model C400 of stainless steel construction, complete with 50 H.P. vertical motor, may be used to separate the product size crystals from the mother liquor.

It will be appreciated that the foregoing specific data with regard to the system and apparatus of FIG. 1 and the mode of operation thereof is illustrative and numerous changes and variations may be made.

Once the system of FIG. 1 is in operation as described it may be maintained in a self-seeding condition so that no additional or external seeding is required, provided that seed crystals or nuclei are generated at a sufficient rate in the system by nucleating stimuli and by attrition. The nucleating stimuli in the system of FIG. 1 are largely furnished by the pumps, particularly by the main recirculating pump 13. The faster the speed at which the pump is driven the greater will be the nucleating stimuli imparted to the circulating slurry and the greater will be the number of seed crystals formed. The greater the number of crystals that are formed the smaller the size of the product crystals and conversely, the fewer crysals formed the larger will be their size. The speed of the circulating pump 13 and the size of the crystals formed vary inversely to each other.

In the event that the nucleating stimuli generated by the pump 13 are insufficient and additional nucleating stimuli are required to increase the formation of crystal nuclei and thereby produce and control the number of smaller crystals, such additional nucleating stimuli may be furnished by incorporating one or more of several suitable pieces of equipment. In this regard it is important to note that the use of additional energy input devices to provide additional nucleating stimuli to the system is preferred since it enables the pump 13 to be operated at lower speeds which are more economical with regard to overall power requirements for the crystallization apparatus. In other words, while the use of increased pumping speeds can be employed to provide the desired degree of nucleating stimuli to the liquor, the use of increased pumping speeds generally is a relatively costly technique for attaining this end.

Referring to FIG. 2, one means for providing additional nucleating stimuli is shown which comprises a rotating member 40 capable of providing cavitation or imparting mechanical energy to the liquid in the vessel 5, such as a rotary saw blade, a notched disc, a perforated disc, or a turbine wheel. The member 40 is suitably mounted on a central hub 41 fitted on the inner end of a shaft 42 projecting into the crystallizer vessel 5 below the normal liquid level in a region of maximum supersaturation. The shaft 42 projects through the wall of the vessel 5 and is journalled in a liquid tight bearing 43 of known type mounted on the exterior of the tank wall. The shaft 42 on its outer end carries a pulley 44 which is driven by a belt 45 running over the drive pulley 46 on the end of the rotor shaft 47 of a motor 48. The motor 48 is mounted on a bracket 50 on the side of the tank or crystallizer vessel 5. The rotation of the blade 40 within the contents of the vessel 5 produces nucleating stimuli which promote crystal nuclei formation. Thus, the arrangement described may be used to augment the nucleating stimuli furnished to the slurry by the circulating pump 13. The blade disc 40 may have a diameter ranging from 3 to 12 inches. Variations in speed may be obtained in several known ways, e.g., by regulating the speed of the motor 48 or by use of a variable drive.

The rotating member 40 shown in FIGURE 2 is preferably operated at a speed which will provide an energy input into the liquor which, in combination with all other energy input devices employed in the crystallization apparatus, will provide a sufficient degree of nucleating stimuli such that a granulated sugar product will be produced which will fall within the desired size range. Typically, such a granulated sugar product will be produced wherein the bulk of the crystals will fall within the size range of from 30 to 70 mesh (Tyler). The rotational speed of such a rotating member 40 will of course depend upon the diameter of the member 40 as well as the total nucleating stimuli provided by other energy input devices in the crystallization apparatus. Typically, however, where the only nucleating stimuli are provided by the main circulating pump 13 and the rotating member 40 and the main circulating pump is operating at normal pump speeds (e.g., around 650 to 760 r.p.m.) the rotating member would have a tip speed of at least 1500 feet per minute.

In FIG. 3 a somewhat more elaborate means for imparting mechanical energy and generating nucleating stimuli in the form of vibratory or wave energy to the contents of the crystallizer vessel 5, is shown. A line 51 comes off from the leg 11 and leads into the inlet connection of a positive pressure pump of known type, for example, a Moyno pump. This type of pump can readily discharge the slurry at a pressure of 225 p.s.i.g. at the rate of 5 to 8 gallons per minute. The discharge connection from the pump 52 leads through a line 53 to the inlet connection of a high frequency generator indicated at 54 of known type, for example, a so-called Sonic Whistle. These devices are available commercially from Sonic Engineering Company, Norwalk, Conn. The discharge connection of the sonic whistle 54 connects through the relative short line 55 into the interior of the crystallizer vessel 5 below the normal liquid level therein. The sonic whistle 54 operates to impart high frequency vibratory energy input to the liquid contents of the vessel 5. The pressure of the liquid flowing through the sonic whistle 54 is considerably reduced from an input pressure of 225 p.s.i.g. down to a discharge pressure in the order of 15 p.s.i.g.

It will be seen from the foregoing that product crystal size may be suitably controlled by employing one or more of the three following techniques or means:

(1) By adjusting the proportion of fine crystals returned in the mother liquor from the centrifuge 23.

(2) By varying the speed of the main circulating pump 13.

(3) By using the rotating member 40 and varying the speed thereof, by use of the ultrasonic generator 54 and regulating the output thereof, or by some other means for creating nucleating stimuli in or near a region of super-saturation.

While any single, or a combination of the foregoing techniques or means for regulating crystal size through control over nucleation may be used, preferably a combination of two or more will be employed. In this regard, where additional energy input devices are used, such as the rotating member 40, the use of an ultrasonic generator 54, or other means equivalent thereto, it can be generally noted that such energy input devices will be operated so as to provide a total nucleating stimuli to the supersaturated liquor in the zone of super-saturation such that a sufficient degree of nuclei will be generated to produce a granulated sugar product which will fall within the desired size range. As previously noted, such a granulated sugar product would normally include a product wherein the bulk of the sugar crystals fall within the size range of from 30 to 70 mesh (Tyler). Stated otherwise, such additional mechanical stimuli would produce an additional energy input into the supersaturated liquor (over that energy input provided by the main circulating pump), which is equivalent to that provided by a rotating saw blade operating at a tip speed of at 1500 feet per minute.

It will be apparent that a number of changes may be made in the apparatus and operations described above in connection with the drawings. For example, two or more of the crystallizer evaporators 5 may be connected in series in known manner so as to have a multiple-effect system. One centrifuge could be used to serve two or more effects and all or part of the discharge thereof could be distributed between different effects in any desired ratio. The centrifuge 23 may be replaced by some other means for separating crystals from the slurry such as a filter. Super-saturation may be produced by cooling instead of by evaporation. The crystallizer vessel 5 may have other shapes, and the heater 16 may be horizontally disposed. The rotating member 40 of FIG. 2 could be disposed in a side-cavity of the vessel 5 so long as there was adequate exposure to the contents of the vessel 5 in a region of maximum super-saturation. The sonic whistle 54, which is a high frequency generator operating in the ultrasonic frequency range may be replaced by some other high frequency generator operating at a frequency of at least 8,000 cycles/second. High frequency generators could be used that would be disposed in the vessel 5. Likewise, other modifications may be made to the process and apparatus herein described without departing from the spirit of the present invention or the scope of the appended claims.

We claim:

1. The method for continuously producing crystalline sucrose having a predetermined particle size range without producing larger crystals and without destroying finer crystals from an aqueous solution which comprises maintaining a body of aqueous sucrose slurry in a closed vessel having a freeboard space maintained at a vapor pressure below that of the sucrose slurry thereby inducing evaporation of water and providing a zone of supersaturation of sucrose in said slurry, continuously heating said slurry at a rate selected to maintain a substantially constant rate of evaporation within said body and supersaturation of the slurry, continuously separating only particles within said particle size range from said slurry, continuously feeding aqueous sucrose liquor to said body, and continuously mechanically stimulating the supersaturated sucrose to produce an energy input into said zone of supersaturation which is equivalent to the energy input produced by a rotating saw blade having a tip speed of at least 1500 feet per minute, whereby a sufficient degree of nucleation in the zone of supersaturation of sucrose in said slurry will be provided such that a crystalline sucrose product having a particle size distribution which falls within the desired particle size range will be produced.

2. The method of claim 1 wherein said supersaturated sucrose liquor is continuously mechanically stimulated by a circulation pump and an additional mechanical energy input device, said additional mechanical energy input device having a variable and controllable speed, regulating the speed of said additional mechanical energy input device to control the formation of nuclei in said zone of supersaturation to provide the desired level of energy input into said zone of supersaturation for producing a crystalline sucrose product having a particle size distribution which falls within the desired particle size and range, whereby the rate at which nuclei are formed in said zone of supersaturation can be regulated without necessitating a change in the operational speed of the circulation pump.

3. The method of claim 2 wherein said additional mechanical energy input device is continuously operated to produce an energy input in the zone of supersaturation of said sucrose liquor which is equivalent to the energy input produced by a rotating saw blade having a tip speed of at least 1500 feet per minute.

4. The method of claim 2 wherein said additional mechanical energy input device is a rotating member which is continuously operated at a tip speed of at least 1500 feet per minute.

5. The continuous method of producing crystalline sucrose ranging in particle size from approximately 50 to 70 U.S. Mesh without producing larger crystals and having particle size distribution corresponding to a coefficient of variation (C.V.) of 35–50% which comprises, maintaining a body of supersaturated aqueous sucrose slurry in a closed crystallizer vessel having a freeboard space maintaining at subatmospheric pressure, continuously withdrawing slurry from said vessel, passing said slurry through heater means so as to heat the same and returning said heated slurry to said vessel, continuously diverting a portion of said slurry into means for separating only product size sucrose crystals and returning at least a portion of a separated filtrate of mother liquor containing any undersize crystals that may be present therein into the system comprising said vessel and heater means.

6. The method of claim 5 wherein sufficient mother liquor is bled off so as to prevent the impurities in said aqueous sucrose slurry from exceeding about 10% of the total solids present.

7. The method of claim 5 wherein the size of sucrose crystals in said body of aqueous sucrose slurry is controlled by controlling the number of nuclei present in said slurry by imparting nucleating stimuli to said slurry.

8. The method of claim 5 wherein the size of sucrose crystals in said body of aqueous sucrose slurry is controlled by controlling the number of nuclei present in said slurry in part by regulating the speed of the pump that circulates said stream through said heater and in part by spinning at least one rotatable element submerged in said body of aqueous sucrose slurry in said vessel.

9. The method of claim 5 wherein the size of sucrose crystals in said body of aqueous sucrose slurry in controlled by controlling the number of nuclei present in said slurry, in part by regulating the speed of the pump that circulates said stream through said heater and in part by diverting a minor portion of said slurry through a pressurizing device, passing the pressurized stream through a high frequency generator arranged to discharge into said body of aqueous sucrose slurry in said vessel.

10. The continuous method of producing crystalline sucrose ranging in particle size from approximately 50 to 70 U.S. Mesh without producing larger crystals and having particle size distribution corresponding to a coefficient of variation (C.V.) of 35–50% which comprises, maintaining a body of supersaturated heated aqueous sucrose slurry undergoing evaporation in an evaporator having a freeboard space maintained under subatmospheric pressure, continuously withdrawing a main stream of said slurry from said evaporator by means of a pump, passing it through a heat exchanger to raise its temperature, and returning said stream to said evaporator, said main stream being withdrawn and returned to said evaporator at a rate sufficient to turn over said body of heated aqueous sucrose slurry from between one-half to four times every minute, continuously diverting a relatively small stream of said aqueous slurry equalling from about 1.5 to 5% of the total body of sucrose slurry from said evaporator-pump-heater recirculating system and discharging said small stream into means for separating product size sucrose crystals from slurry, separating only product size crystals and returning at least a portion of the residual stream of mother liquor containing any undersize crystals that may be present therein to said recirculating system.

11. The method of claim 10 wherein sufficient mother liquor is bled off so as to prevent the impurities in said aqueous sucrose slurry from exceeding about 10% of the total solids present.

12. The continuous method of producing crystalline sucrose ranging in particle size from approximately 50 to 70 U.S. Mesh and having particle size distribution corresponding to a coefficient of variation (C.V.) of 35–50% which comprises, maintaining a body of supersaturated heated aqueous sucrose slurry undergoing evaporation in an evaporator having a freeboard space maintained at an absolute pressure in the range of about 2.3 to 20 inches of mercury, withdrawing a main stream of said slurry from said evaporator by means of a circulating pump, passing at least a part of said stream through a heat exchanger into which it enters at a temperature in the range of about 50–90° C. and from which it discharges at a higher temperature in the range of about 50–90° C., and returning said main stream to said evaporator, the rate of recirculation of said slurry through said circulating pump being sufficient so that from about one-half to four times the total volume of said slurry is recirculated every minute, continuously diverting a small stream of said slurry equal to about 0.5 to 5% of the total body of slurry from said evaporator-pump-heater recirculating system and discharging said small stream into a continuous centrifuge for separating product size sucrose crystals from mother liquor, returning at least a portion of said mother liquor with any undersize sucrose crystals that may be present therein to said recirculating system, preventing the content of impurities in said slurry from exceeding 10% of the total solid content thereof by bleeding off a portion of said mother liquor, and maintaining said body of sucrose slurry by feeding purified sugar juice having a solid content of from about 60–80% and a temperature of from about 25–100° C. into said recirculating system.

13. The process for continuously producing from an aqueous sucrose slurry crystalline sucrose having a predetermined particle size range which comprises circulating said sucrose slurry through a closed loop having first and second zones therein, treating said sucrose slurry circulating through said loop to create a higher degree of supersaturation in said first zone than exists in said second zone, subjecting supersaturated sucrose slurry in said first zone to nucleating stimuli provided by a main circulation pump and an additional mechanical energy input device, regulating the number of nuclei being formed in said first supersaturation zone by controlling the energy input therein produced by said additional mechanical energy input device, continuously feeding sucrose solution to said loop, continuously withdrawing sucrose slurry from said loop, and continuously removing product size sucrose crystals from said withdrawn slurry.

14. The process called for in claim 13 wherein undersize sucrose crystals remaining after removal of product size sucrose crystals from said slurry are returned to said loop for further growth.

15. Apparatus for the continuous production of crystalline sucrose which comprises: a main circulating system comprising a separate enclosed crystallizer vessel having a freeboard space with vacuum connection, a heat exchanger, and a circulating pump interconnected in series circuit relationship whereby a stream of aqueous sucrose slurry may be continuously withdrawn from said crystallizer vessel, passed through said heat exchanger and returned to said vessel; a secondary circulating system comprising a slurry discharge pump having its inlet connection communicating with said main circulating system, means for separating only crystalline sucrose greater than a predetermined minimum particle size from mother liquor and undersized crystals, said separating means having an inlet connection communicating with the discharge connection of said slurry discharge pump and having a mother liquor discharge connection and a product crystal discharge connection, and liquid transmitting means communicating between said mother liquor discharge connection and said main circulating system for returning mother liquor thereto; and means for mechanically stimulating and inducing nucleation in the aqueous sucrose slurry within said main circulating system.

16. The apparatus of claim 15 wherein said means for mechanically stimulating and inducing nucleation is a device having a rotating element exposed to said aqueous sucrose slurry in a region of maximum super-saturation.

17. The apparatus of claim 15 wherein said means for mechanically stimulating and inducing nucleation is a high frequency generator disposed to take in a stream of aqueous sucrose slurry and discharge into a region of maximum super-saturation.

18. Apparatus for continuous production of crystalline sucrose, comprising a separate enclosed crystallizer vessel having a freeboard space with a vacuum connection, a heat exchanger and a circulating pump interconnected in series circuit relationship, energy input means independent of said circulating pump, said energy input means being located in said apparatus for inducing nucleation in a supersaturated zone of liquor contained in said apparatus, means continuously feeding aqueous sucrose to said apparatus, and means for withdrawing particles of a predetermined size from said apparatus, whereby said energy input means can be operated independently of said circulating pump for inducing the formation of nuclei in the supersaturated liquor contained therein without affecting the operation of said circulating pump.

19. The apparatus of claim 18 wherein said independent energy input means is provided with means for varying the level of energy produced thereby for controlling the degree of nucleation induced in a supersaturated liquor contained in said apparatus.

20. The apparatus of claim 18 wherein said independent energy input means is a rotatable member.

21. The apparatus of claim 18 wherein said independent energy input means is a high frequency sonic generator.

References Cited

UNITED STATES PATENTS

| | | | |
|---|---|---|---|
| 743,352 | 11/1903 | Trump | 127—61 X |
| 1,693,786 | 12/1928 | Isaachsen | 159—45 |
| 2,384,747 | 9/1945 | Hughes | 23—273 X |

FOREIGN PATENTS

| | | |
|---|---|---|
| 585,583 | 2/1947 | Great Britain. |

OTHER REFERENCES

Vanhook et al.: "Graining by Sound," Int. Sugar J. (1954), p. 185.

Vanhook et al.: "Nucleation in Sucrose Solutions," I & EC (1952), pp. 1305–1308.

Bennett: "Product . . . Crystallizers," CEP, 58 No. 9, pp. 76–80 (1962).

Thompson: "Crystallizers," Chem. Engineering, pp. 125–132 (October 1950).

MORRIS O. WOLK, Primary Examiner

D. G. CONLIN, Assistant Examiner

U.S. Cl. X.R.

23—273, 295; 127—58, 61

UNITED STATES PATENT OFFICE
CERTIFICATE OF CORRECTION

Patent No. 3,503,803          Dated March 31, 1970

Inventor(s) Richard C. Bennett and Harold B. Caldwell

It is certified that error appears in the above-identified patent and that said Letters Patent are hereby corrected as shown below:

Column 1, line 18, delete "sired size range, for example," and insert --so as to provide--
Column 1, line 19, after "within" cancel "the" and insert --a desired--
Column 1, line 19, after "range" insert --, for example, a sugar product which falls within the size range
Column 1, line 41, "throught" should be --throughout--
Column 2, line 55, "seocnd" should be --second--
Column 2, line 56, after "shipped" insert a period (.)
Column 5, line 62, "reads" should be --readings--

SIGNED AND
SEALED
AUG 18 1970

(SEAL)
Attest:

Edward M. Fletcher, Jr.
Attesting Officer

WILLIAM E. SCHUYLER, JR.
Commissioner of Patents